(12) United States Patent
    Bachar

(10) Patent No.:     US 12,652,292 B2
(45) Date of Patent:          Jun. 9, 2026

(54) CYBER DEFENSE AUTOMATION ENGINE

(71) Applicant: Rockwell Automation Technologies, Inc., Mayfield Heights, OH (US)

(72) Inventor: Roni Bachar, Zoran (IL)

(73) Assignee: Rockwell Automation Technologies, Inc., Mayfield Heights, OH (US)

( * ) Notice:     Subject to any disclaimer, the term of this patent is extended or adjusted under 35 U.S.C. 154(b) by 174 days.

(21) Appl. No.: 18/226,600

(22) Filed: Jul. 26, 2023

(65) Prior Publication Data
    US 2025/0039192 A1     Jan. 30, 2025

(51) Int. Cl.
    H04L 9/40          (2022.01)
(52) U.S. Cl.
    CPC ...... H04L 63/1416 (2013.01); H04L 63/1433 (2013.01)
(58) Field of Classification Search
    CPC ...................... H04L 63/1433; H04L 63/1416
    See application file for complete search history.

(56) References Cited

U.S. PATENT DOCUMENTS

| | | | | |
|---|---|---|---|---|
| 2019/0207971 A1* | 7/2019 | Sharfuddin | ............. | G06F 9/445 |
| 2021/0194924 A1* | 6/2021 | Heinemeyer | ........... | G06N 5/04 |
| 2022/0311795 A1* | 9/2022 | Hutelmyer | .......... | H04L 63/1433 |
| 2023/0283629 A1* | 9/2023 | Boyer | ................. | H04L 63/1416 726/22 |
| 2023/0319081 A1* | 10/2023 | Fainberg | ............. | H04L 63/1425 726/22 |
| 2023/0336581 A1* | 10/2023 | Dunn | ..................... | G06F 21/577 |
| 2024/0031395 A1* | 1/2024 | Kiss | ........................ | H04L 41/22 |
| 2024/0095350 A1* | 3/2024 | Withnell | ................ | G06F 21/554 |
| 2024/0297896 A1* | 9/2024 | Watanabe | ............... | G06F 21/57 |
| 2024/0427876 A1* | 12/2024 | Woodward | ............ | G06F 21/552 |

* cited by examiner

*Primary Examiner* — Joseph P Hirl
*Assistant Examiner* — Thomas A Gyorfi
(74) *Attorney, Agent, or Firm* — Fletcher Yoder, P.C.

(57)          ABSTRACT

A non-transitory computer readable medium stores instructions that, when executed by a processor, cause the processor to retrieve, from a catalog, a set of characteristics associated with a cyberattack, generate a plurality of packets having the set of cyberattack characteristics, wherein the plurality of packets collectively simulate the cyberattack, transmit the plurality of packets over a virtual operational technology (OT) network comprising a virtual network security system, and receive an alert indicating whether one or more of the plurality of packets was detected by the virtual network security system.

20 Claims, 9 Drawing Sheets

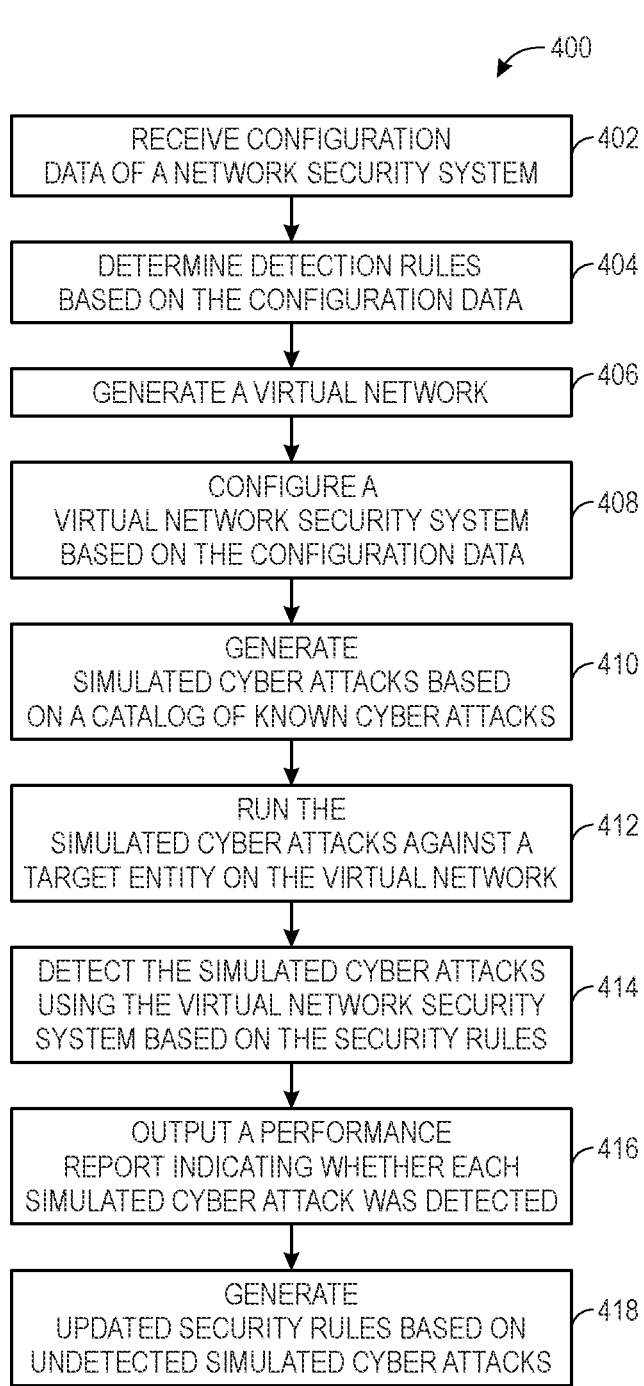

400

RECEIVE CONFIGURATION
DATA OF A NETWORK SECURITY SYSTEM
— 402

DETERMINE DETECTION RULES
BASED ON THE CONFIGURATION DATA
— 404

GENERATE A VIRTUAL NETWORK
— 406

CONFIGURE A
VIRTUAL NETWORK SECURITY SYSTEM
BASED ON THE CONFIGURATION DATA
— 408

GENERATE
SIMULATED CYBER ATTACKS BASED
ON A CATALOG OF KNOWN CYBER ATTACKS
— 410

RUN THE
SIMULATED CYBER ATTACKS AGAINST A
TARGET ENTITY ON THE VIRTUAL NETWORK
— 412

DETECT THE SIMULATED CYBER ATTACKS
USING THE VIRTUAL NETWORK SECURITY
SYSTEM BASED ON THE SECURITY RULES
— 414

OUTPUT A PERFORMANCE
REPORT INDICATING WHETHER EACH
SIMULATED CYBER ATTACK WAS DETECTED
— 416

GENERATE
UPDATED SECURITY RULES BASED ON
UNDETECTED SIMULATED CYBER ATTACKS
— 418

*FIG. 6*

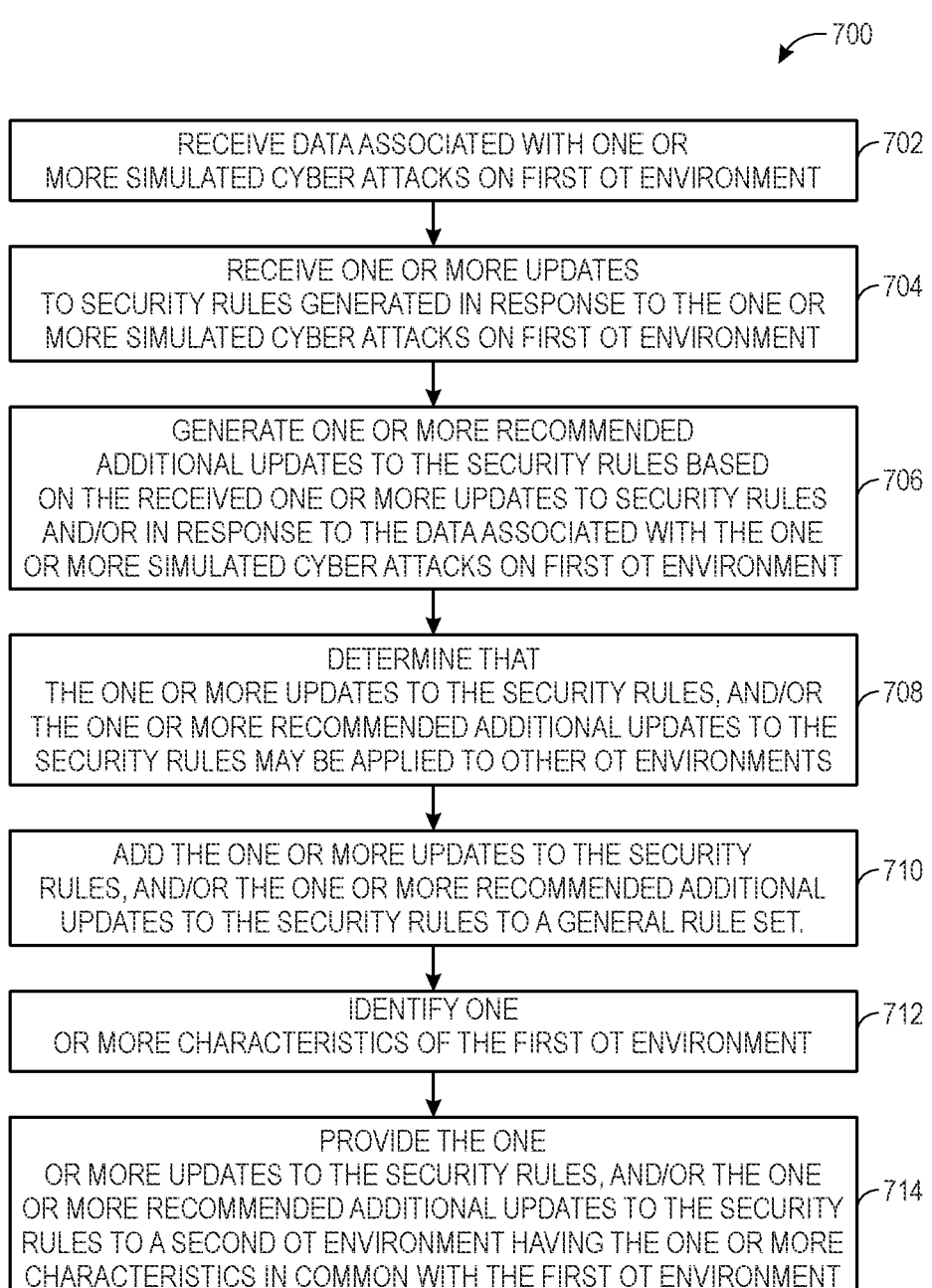

— 700

RECEIVE DATA ASSOCIATED WITH ONE OR
MORE SIMULATED CYBER ATTACKS ON FIRST OT ENVIRONMENT ⌐ 702

RECEIVE ONE OR MORE UPDATES
TO SECURITY RULES GENERATED IN RESPONSE TO THE ONE OR
MORE SIMULATED CYBER ATTACKS ON FIRST OT ENVIRONMENT ⌐ 704

GENERATE ONE OR MORE RECOMMENDED
ADDITIONAL UPDATES TO THE SECURITY RULES BASED
ON THE RECEIVED ONE OR MORE UPDATES TO SECURITY RULES
AND/OR IN RESPONSE TO THE DATA ASSOCIATED WITH THE ONE
OR MORE SIMULATED CYBER ATTACKS ON FIRST OT ENVIRONMENT ⌐ 706

DETERMINE THAT
THE ONE OR MORE UPDATES TO THE SECURITY RULES, AND/OR
THE ONE OR MORE RECOMMENDED ADDITIONAL UPDATES TO THE
SECURITY RULES MAY BE APPLIED TO OTHER OT ENVIRONMENTS ⌐ 708

ADD THE ONE OR MORE UPDATES TO THE SECURITY
RULES, AND/OR THE ONE OR MORE RECOMMENDED ADDITIONAL
UPDATES TO THE SECURITY RULES TO A GENERAL RULE SET. ⌐ 710

IDENTIFY ONE
OR MORE CHARACTERISTICS OF THE FIRST OT ENVIRONMENT ⌐ 712

PROVIDE THE ONE
OR MORE UPDATES TO THE SECURITY RULES, AND/OR THE ONE
OR MORE RECOMMENDED ADDITIONAL UPDATES TO THE SECURITY
RULES TO A SECOND OT ENVIRONMENT HAVING THE ONE OR MORE
CHARACTERISTICS IN COMMON WITH THE FIRST OT ENVIRONMENT ⌐ 714

*FIG. 9*

CYBER DEFENSE AUTOMATION ENGINE

BACKGROUND

This disclosure generally relates to cybersecurity of an operational technology (OT) environment. More particularly, embodiments of the present disclosure relate to techniques for testing network security systems against simulated cyberattacks in an OT environment.

Industrial automation systems may be used to provide automated control of one or more actuators in an industrial setting. OT networks may be used to communicatively couple industrial automation systems and/or industrial automation components within an automation system. As a protective measure, the OT network may employ a network security system to detect or block malicious activity within the OT network. For example, an intrusion detection system (IDS) may detect cyberattacks by monitoring traffic over the network. However, unidentified gaps in the network security system may render the OT network vulnerable to attack, especially as hacking techniques and tools adapt over time. As such, techniques for identifying and remediating gaps in network security systems are desired.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this present disclosure. Indeed, this present disclosure may encompass a variety of aspects that may not be set forth below.

In one embodiment, a non-transitory computer readable medium stores instructions that, when executed by a processor, cause the processor to receive configuration data corresponding to a network security system. The network security system is configured to monitor network activity within an operational technology (OT) environment, and the configuration data is representative of one or more operational parameters of the network security system. The instructions, when executed, also cause the processor to execute a virtual network including a virtual network security system configured based on the configuration data. Additionally, the instructions, when executed, cause the processor to deploy a simulated cyberattacks on the virtual network. Furthermore, the instructions, when executed, cause the processor to identify one or more of the simulated cyberattacks that were not detected by the virtual network security system. The instructions, when executed, also cause the processor to generate a notification identifying the one or more of the simulated cyberattacks that were not detected by the virtual network security system.

In another embodiment, a method includes receiving configuration data corresponding to a network security system configured to monitor network activity within an operational technology (OT) environment. The configuration data includes a set of detection rules configured to classify the network activity as associated with a cyberattack or not associated with a cyberattack. The method also includes configuring a virtual network security system based on the configuration data. Additionally, the method includes generating a simulated cyberattack and deploying the virtual network security system to classify the simulated cyberattack as a threat or not a threat. The method further includes generating an alert in response to the virtual network security system classifying the simulated cyberattack as not a threat.

In yet another embodiment, a non-transitory computer readable medium stores instructions that, when executed by a processor, cause the processor to receive configuration data from a client device. The configuration data is associated with a configuration of a network security system of an operational technology (OT) environment. The instructions, when executed, also cause the processor to configure a virtual network security system based on the configuration data. Furthermore, the instructions, when executed, cause the processor to generate simulated cyberattacks and deploy the virtual network security system to classify each simulated cyberattack. Additionally, the instructions, when executed, cause the processor to determine whether the virtual network security system correctly classified each simulated cyberattack. The instructions, when executed, cause the processor to further generate a report including a list of simulated cyberattacks that were not correctly classified by the virtual network security system.

BRIEF DESCRIPTION OF THE DRAWINGS

These and other features, aspects, and advantages of the present disclosure may become better understood when the following detailed description is read with reference to the accompanying drawings in which like characters represent like parts throughout the drawings, wherein:

FIG. 6 is a flowchart of a process for testing a virtual network security system via the cybersecurity simulator of FIG. 4, in accordance with an embodiment;

FIG. 9 is a flowchart of a process for operating the OT cyber defense cloud service platform of FIG. 5.

DETAILED DESCRIPTION

Figure 1:
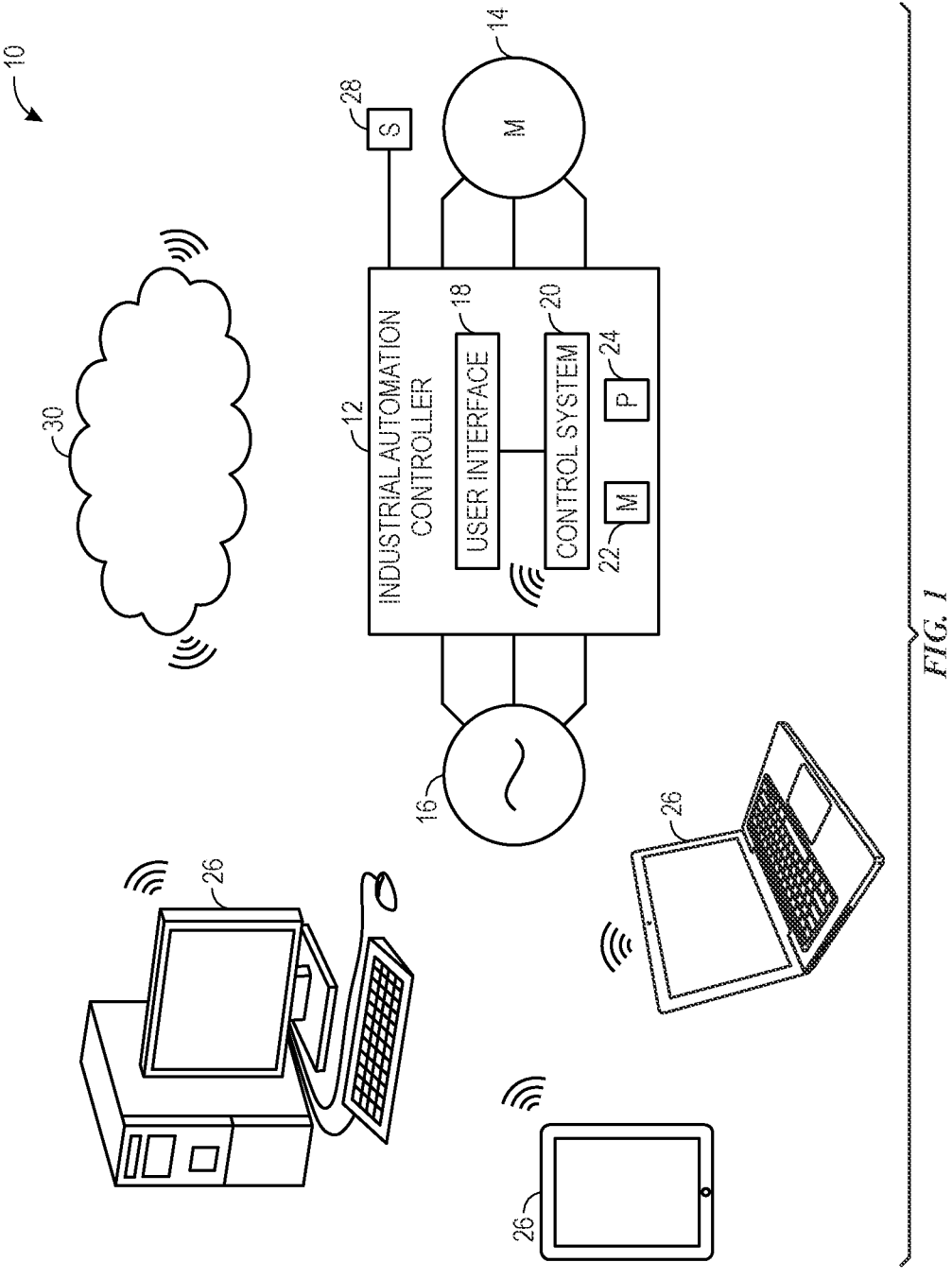
FIG. 1 is a schematic view of an OT environment, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As discussed above, an OT environment, such as an industrial automation system, includes hardware and software (i.e., operational technology) configured to monitor and/or control industrial equipment. Unfortunately, these systems may be targets of cyberattack by malicious actors, resulting in damage, loss of control of and/or access to assets and/or data, leakage, or theft of data, hardware, and software. To mitigate such attacks, the OT environment may employ a network security system, such as an IDS, to monitor network traffic and/or system files for suspicious activity or policy violations. By detecting and recording threats to the OT environment, the network security system may draw an administrator's attention to any attacks or vulnerabilities. However, the network security system may include gaps in detection capabilities that allow some attacks to slip through the OT environment undetected. Moreover, these gaps may widen as attackers adapt their techniques and tools, and as the configuration of the OT environment changes. Therefore, it may be desirable to test the network security system against simulated attacks to evaluate the network security system and expose its vulnerabilities.

With this in mind, the present disclosure relates to techniques for testing a network security system by simulating cyberattacks within a virtual network. For example, the network security system may be configured to monitor network activity across a real network of an OT environment. In order to safely observe the performance of the network security system without disrupting the OT environment, a cybersecurity simulator provides the virtual network as a testing environment. The cybersecurity simulator may be a remote service (e.g., software as a service, cloud-based platform) or an on-premises product within the OT environment. The virtual network may act as a representation (e.g., model, stand-in, digital twin, image, copy) of the real network. Specifically, the cybersecurity simulator implements a virtual network security system (e.g., IDS) within the virtual network, such that the virtual network security system corresponds to the network security system of the real network. In this way, a user may extrapolate insights about the real network and the network security system based on observations of the virtual network and the virtual network security system.

The virtual network security system may be created or implemented based on a configuration of the network security system. That is, configuration data, such as operational parameters and protocols, of the network security system may be used to configure the virtual network security system. In this way, the virtual network security system may operate on the virtual network in a manner that corresponds to the operation of the network security system on the real network. For example, the configuration data may be extracted or determined from the network security system and provided to the cybersecurity simulator by a user. Among other data, the configuration data may include a set of detection rules that define malicious activity. Then, the virtual network security system may monitor the virtual network and detect security threats based on the detection rules. That is, the virtual network security system may monitor incoming traffic to the virtual network and/or traffic between virtual machines of the virtual network. If the monitored network activity matches the detection rules, the virtual network security system may flag the monitored network activity as a potential threat. In some embodiments, the cybersecurity simulator may provide a target entity (e.g., victim, dummy, test target), and the virtual network security system may monitor network activity (e.g., traffic) directed toward the target entity.

The cybersecurity simulator may include an cyberattack engine that generates and deploys simulated cyberattacks within the virtual network. The cyberattack engine may generate the simulated cyberattacks by referencing a catalog of malicious characteristics of known cyberattacks. Based on the catalog, the cyberattack engine may generate packets (e.g., simulated network activity) having the malicious characteristics. The packets may include messages, content, metadata, protocols, signatures, and other information or structure indicative of a cyberattack. Then, the cyberattack engine may transmit the packets within the virtual network, whereupon the virtual network security system may monitor the packets. For example, the cyberattack engine may transmit the packets to the target entity provided by the cybersecurity simulator, as if to "attack" the target entity.

The cyberattack engine may repeatedly (e.g., continually) create simulated cyberattacks, each of the simulated cyberattacks including one or more packets of malicious-type activity. For each simulated cyberattack, the cyberattack engine determines whether the virtual network security system detected the simulated cyberattack, whereupon the cyberattack engine may implement a subsequent simulated cyberattack. By collecting samples of detected and undetected simulated cyberattacks, the cybersecurity simulator may determine performance metrics of the network security system and identify deficiencies (e.g., gaps) in the detection rules. For example, the cybersecurity simulator may generate a report indicating the performance metrics, as well as deficiencies including any undetected simulated cyberattacks.

By way of introduction, FIG. 1 is a schematic view of an example OT environment 10 in which the embodiments described herein may be implemented. As shown, the OT environment 10 is an industrial automation system that includes a controller 12 and an actuator 14 (e.g., a motor). The OT environment 10 may also include, or be coupled to, a power source 16. The power source 16 may include a generator, an external power grid, a battery, or some other source of power. The controller 12 may be a stand-alone control unit that controls multiple industrial automation components (e.g., a plurality of motors 14), a controller 12 that controls the operation of a single automation component (e.g., motor 14), or a subcomponent within a larger OT environment 10. In the instant embodiment, the controller 12 includes a user interface 18, such as a human machine interface (HMI), and a control system 20, which may include a memory 22 and a processor 24. The controller 12 may include a cabinet or some other enclosure for housing various components of the OT environment 10, such as a motor starter, a disconnect switch, etc.

The control system 20 may be programmed (e.g., via computer readable code or instructions stored on the memory 22, such as a non-transitory computer readable medium, and executable by the processor 24) to provide signals for controlling the motor 14. In certain embodiments, the control system 20 may be programmed according to a specific configuration desired for a particular application. For example, the control system 20 may be programmed to respond to external inputs, such as reference signals, alarms, command/status signals, etc. The external inputs may originate from one or more relays or other electronic devices. The programming of the control system 20 may be accomplished through software or firmware code that may be loaded onto the internal memory 22 of the control system 20 (e.g., via a locally or remotely located computing device 26) or programmed via the user interface 18 of the controller 12. The control system 20 may respond to a set of operating parameters. The settings of the various operating parameters may determine the operating characteristics of the controller 12. For example, various operating parameters may determine the speed or torque of the motor 14 or may determine how the controller 12 responds to the various external inputs. As such, the operating parameters may be used to map control variables within the controller 12 or to control other devices communicatively coupled to the controller 12. These variables may include, for example, speed presets, feedback types and values, computational gains and variables, algorithm adjustments, status and feedback variables, programmable logic controller (PLC) control programming, and the like.

In some embodiments, the controller 12 may be communicatively coupled to one or more sensors 28 for detecting operating temperatures, voltages, currents, pressures, flow rates, and other measurable variables associated with the OT environment 10. With feedback data from the sensors 28, the control system 20 may keep detailed track of the various conditions under which the OT environment 10 may be operating. For example, the feedback data may include conditions such as actual motor speed, voltage, frequency, power quality, alarm conditions, etc. In some embodiments, the feedback data may be communicated back to the computing device 26 for additional analysis.

The computing device 26 may be communicatively coupled to the controller 12 via a wired or wireless connection. The computing device 26 may receive inputs from a user defining an industrial automation project using a native application running on the computing device 26 or using a website accessible via a browser application, a software application, or the like. The user may define the industrial automation project by writing code, interacting with a visual programming interface, inputting or selecting values via a graphical user interface, or providing some other inputs. The user may use licensed software and/or subscription services to create, analyze, and otherwise develop the project. The computing device 26 may send a project to the controller 12 for execution. Execution of the industrial automation project causes the controller 12 to control components (e.g., motor 14) within the OT environment 10 through performance of one or more tasks and/or processes. In some applications, the controller 12 may be communicatively positioned in a private network and/or behind a firewall, such that the controller 12 does not have communication access outside a local network and is not in communication with any devices outside the firewall, other than the computing device 26. The controller 12 may collect feedback data during execution of the project, and the feedback data may be provided back to the computing device 26 for analysis. Feedback data may include, for example, one or more execution times, one or more alerts, one or more error messages, one or more alarm conditions, one or more temperatures, one or more pressures, one or more flow rates, one or more motor speeds, one or more voltages, one or more frequencies, and so forth. The project may be updated via the computing device 26 based on the analysis of the feedback data.

The computing device 26 may be communicatively coupled to a cloud server 30 or remote server via the internet, or some other network. In one embodiment, the cloud server 30 may be operated by the manufacturer of the controller 12, a software provider, a seller of the controller 12, a service provider, operator of the controller 12, owner of the controller 12, etc. The cloud server 30 may be used to help customers create and/or modify projects, to help troubleshoot any problems that may arise with the controller 12, develop policies, or to provide other services (e.g., project analysis, enabling, restricting capabilities of the controller 12, data analysis, controller firmware updates, etc.). The remote/cloud server 30 may be one or more servers operated by the manufacturer, software provider, seller, service provider, operator, or owner of the controller 12. The remote/cloud server 30 may be disposed at a facility owned and/or operated by the manufacturer, software provider, seller, service provider, operator, or owner of the controller 12. In other embodiments, the remote/cloud server 30 may be disposed in a datacenter in which the manufacturer, software provider, seller, service provider, operator, or owner of the controller 12 owns or rents server space. In further embodiments, the remote/cloud server 30 may include multiple servers operating in one or more data center to provide a cloud computing environment.

Figure 2:
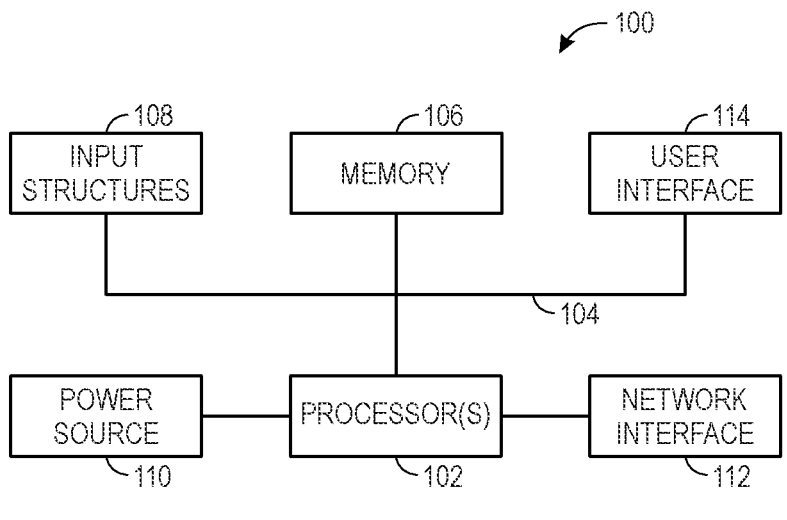
FIG. 2 is a block diagram of example components that could be used in the industrial automation system of FIG. 1, in accordance with an embodiment.

FIG. 2 illustrates a block diagram of example components of a computing device 100 that could be used as the computing device 26, the cloud/remote server 30, the controller 12, or some other device for executing the cybersecurity simulator provided by the present disclosure. As used herein, the computing device 100 may be implemented as one or more computing systems including laptop, notebook, desktop, tablet, HMI, or workstation computers, as well as server type devices or portable, communication type devices, such as cellular telephones and/or other suitable computing devices.

As illustrated, the computing device 100 may include various hardware components, such as one or more processors 102, one or more busses 104, memory 106, input structures 108, a power source 110, a network interface 112, a user interface 114, and/or other computer components useful in performing the functions described herein.

The one or more processors 102 may include, in certain implementations, microprocessors configured to execute instructions stored in the memory 106 or other accessible locations. Alternatively, the one or more processors 102 may be implemented as application-specific integrated circuits (ASICs), field-programmable gate arrays (FPGAs), and/or other devices designed to perform functions discussed herein in a dedicated manner. As will be appreciated, multiple processors 102 or processing components may be used to perform functions discussed herein in a distributed or parallel manner.

The memory 106 may encompass any tangible, non-transitory medium for storing data or executable routines.

Although shown for convenience as a single block in FIG. 2, the memory 106 may encompass various discrete media in the same or different physical locations. The one or more processors 102 may access data in the memory 106 via one or more busses 104.

The input structures 108 may allow a user to input data and/or commands to the device 100 and may include mice, touchpads, touchscreens, keyboards, controllers, and so forth. The power source 110 can be any suitable source for providing power to the various components of the computing device 100, including line and battery power. In the depicted example, the device 100 includes a network interface 112. Such a network interface 112 may allow communication with other devices on a network using one or more communication protocols. In the depicted example, the device 100 includes a user interface 114, such as a display that may display images or data provided by the one or more processors 102. The user interface 114 may include, for example, a monitor, a display, and so forth. As will be appreciated, in a real-world context a processor-based system, such as the computing device 100 of FIG. 2, may be employed to implement some or all of the present approach, such as performing the functions of the controller, the computing device 26, and/or the cloud/remote server 30 shown in FIG. 1, as well as other memory-containing devices.

Figure 3:
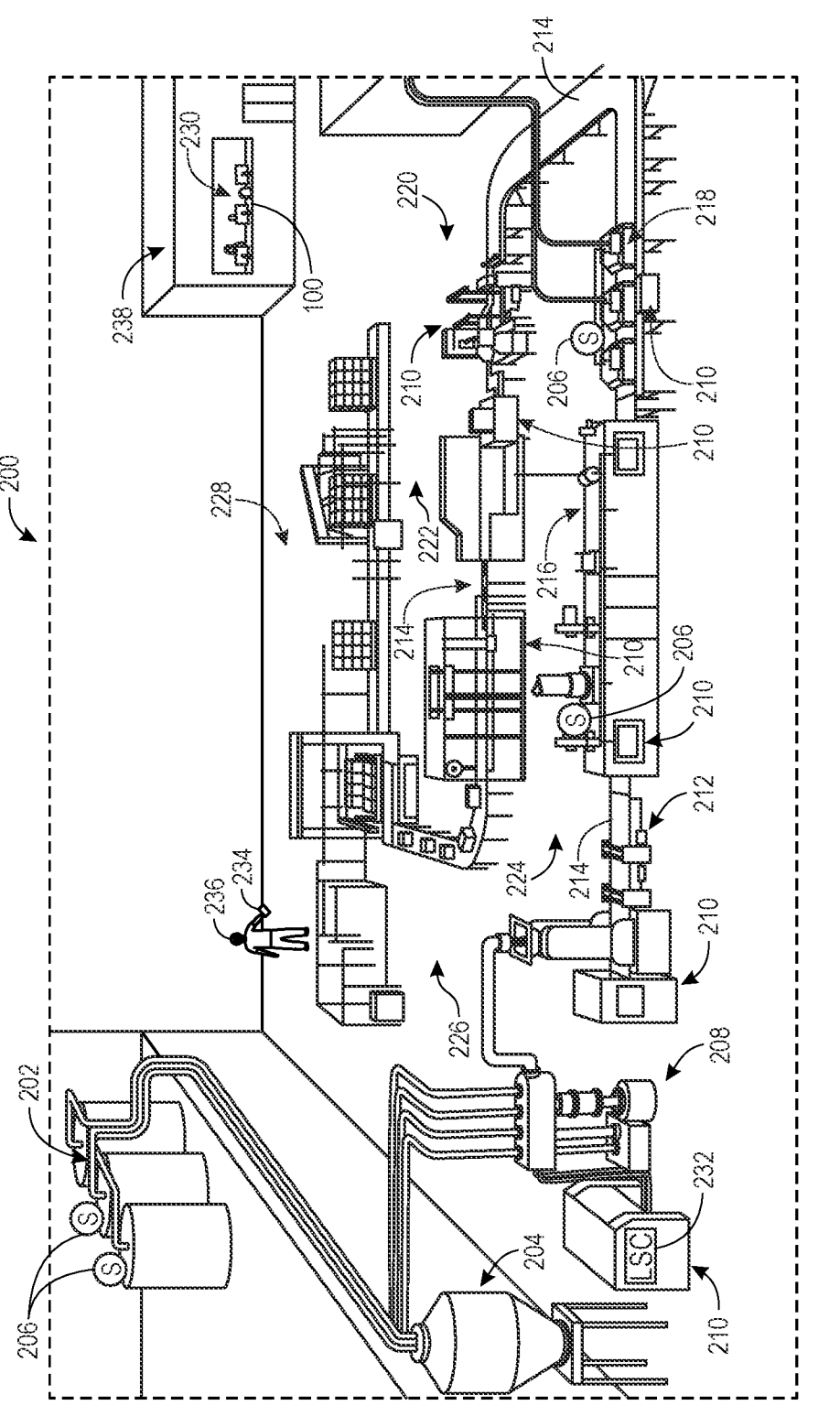
FIG. 3 is a perspective view of an industrial automation system as an example of the OT environment of FIG. 1, in accordance with an embodiment.

FIG. 3 is a perspective view of an example industrial automation system 200 employed by a food manufacturer. It should be noted that although the example industrial automation system 200 of FIG. 3 is directed at a food manufacturer, the present embodiments described herein may be employed within any suitable industry, such as automotive, cosmetics, chemical manufacturing/processing, mining, hydrocarbon production, manufacturing, and the like. The following brief description of the example industrial automation system 200 employed by the food manufacturer is provided herein to help facilitate a more comprehensive understanding of the OT environment to which the techniques described herein may be applied. As such, the embodiments described herein should not be limited to be applied to the example depicted in FIG. 3.

Referring now to FIG. 3, the example industrial automation system 200 for a food manufacturer may include any number of machines, such as silos 202 and tanks 204. The silos 202 and the tanks 204 may store different types of raw material, such as grains, salt, yeast, sweeteners, flavoring agents, coloring agents, vitamins, minerals, and preservatives. In some embodiments, sensors 206 may be positioned within or around the silos 202, the tanks 204, or other suitable locations within the industrial automation system 200 to measure certain properties, such as temperature, mass, volume, pressure humidity, and the like.

The raw materials may be provided to a mixer 208, which may mix the raw materials together according to a specified ratio. The mixer 208 and other machines in the industrial automation system 200 may employ certain industrial automation devices 210 to control the operations of the mixer 208 and other machines. The industrial automation devices 210 may include controllers (e.g., industrial automation controller 12), input/output (I/O) modules, motor control centers (e.g., control system 20), motors (e.g., actuator 14), human-machine interfaces (e.g., user interface 18), operator interfaces, contactors, starters, sensors (e.g., sensor 28, sensors 206), conveyors, drives, relays, protection devices, switchgear, compressors, firewall, network switches (e.g., Ethernet switches, modular-managed, fixed-managed, service-router, industrial, unmanaged, etc.) and the like.

The mixer 208 may provide a mixed compound to a depositor 212, which may deposit a certain amount of the mixed compound onto conveyor 214. The depositor 212 may deposit the mixed compound on the conveyor 214 according to a shape and amount that may be specified to a control system for the depositor 212. The conveyor 214 may be any suitable conveyor system that transports items to various types of machinery across the industrial automation system 200. For example, the conveyor 214 may transport deposited material from the depositor 212 to an oven 216, which may bake the deposited material. The baked material may be transported to a cooling tunnel 218 to cool the baked material, such that the cooled material may be transported to a tray loader 220 via the conveyor 214. The tray loader 220 may include machinery that receives a certain amount of the cooled material for packaging. By way of example, the tray loader 220 may receive 25 ounces of the cooled material, which may correspond to an amount of cereal provided in a cereal box.

A tray wrapper 222 may receive a collected amount of cooled material from the tray loader 220 into a bag, which may be sealed. The tray wrapper 222 may receive the collected amount of cooled material in a bag and seal the bag using appropriate machinery. The conveyor 214 may transport the bagged material to case packer 224, which may package the bagged material into a box. The boxes may be transported to a palletizer 226, which may stack a certain number of boxes on a pallet that may be lifted using a forklift or the like. The stacked boxes may then be transported to a shrink wrapper 228, which may wrap the stacked boxes with shrink-wrap to keep the stacked boxes together while on the pallet. The shrink-wrapped boxes may then be transported to storage or the like via a forklift or other suitable transport vehicle.

To perform the operations of each of the devices in the example industrial automation system 200, the industrial automation devices 210 may be used to provide power to the machinery used to perform certain tasks, provide protection to the machinery from electrical surges, prevent injuries from occurring with human operators in the industrial automation system 200, monitor the operations of the respective device, communicate data regarding the respective device to a supervisory control system 230, and the like. In some embodiments, each industrial automation device 210 or a group of industrial automation devices 20 may be controlled using a local control system 232. The local control system 232 may include receive data regarding the operation of the respective industrial automation device 210, other industrial automation devices 210, user inputs, and other suitable inputs to control the operations of the respective industrial automation devices 210.

An operator device 234 is an example of the computing device 26 that enables an operator 236 to access or interface with other industrial automation devices 210 and/or computing devices. For example, the operator device 234 may include the processor 102, busses 104, memory 106, input structures 108, power source 110, network interface 112, and user interface 114.

Collectively, any or all of the machines (e.g., mixer 208, palletizer 226), the industrial automation devices 210, the computing devices 26, the cloud server 30, the supervisory control system 230, and any other elements of FIG. 3 may constitute the OT environment. These elements may communicate across the OT environment via a network (e.g., a local area network (LAN)). The network may include a network security system configured to monitor traffic into and out of the network. For example, the network security system may intercept data (e.g., packets) transmitted between the machines, the industrial automation devices 210, the cloud server 30, the computing devices 26, and/or other devices external to the network. The network security system may then analyze the transmitted data to identify cyberattacks. For example, the network security system may determine that a packet of transmitted data exhibits signatures similar to signatures of known cyberattacks. Upon identification of a potential cyberattack, the network security system may alert a user, such as a network administrator.

In some embodiments, the network and the network security system may be managed from a network operations center 238 (NOC). The NOC 238 is a centralized location from which a network administrator may monitor and manage the network. For example, the NOC 238 may include a central computing system which executes the network security system, monitors traffic into and out of the network, maintains databases, and manages security policies. As shown, the NOC 238 is local to the industrial automation system 200, but in other embodiments, the NOC 238 may be located at a remote location.

In the illustrated embodiment, the computing device 100 is located in the facility of the industrial automation system 200. As such, the computing device 100 may provide the cybersecurity simulator as an on-premises ("on-prem") system that operates locally within the industrial automation system 200. In this way, the cybersecurity simulator may be executed without transmitting data into or out of the industrial automation system, such as via the internet. In other embodiments, the computing device 100 may be a server, such as an on-prem server, a remote server, and/or the cloud server 30, which may be accessed by a client device via the internet. In this way, the cybersecurity simulator may be provided as a cloud-based software platform that utilizes remote computing resources.

As discussed above, the network security system may include gaps in detection capabilities that allow some cyberattacks to slip through the OT environment undetected. For example, a packet of data containing a security exploit or malicious code may be transmitted to a device on the network without triggering the network security system. For example, the packet of data may not exhibit any signatures of cyberattacks known by the network security system, or the transmission of the packet may circumvent the network security system entirely. Once identified, these vulnerabilities of the network security system can be patched. As such, embodiments of the present disclosure provide techniques for identifying vulnerabilities of the network security system.

Figure 4:
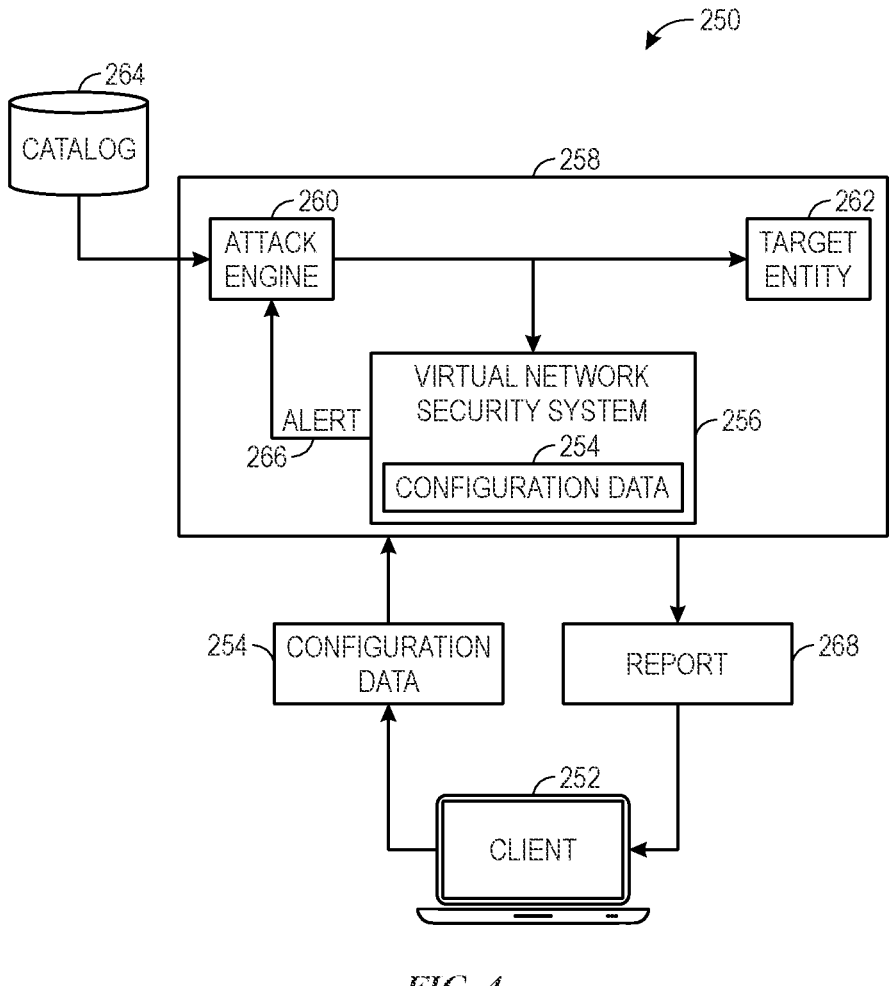
FIG. 4 is a schematic diagram of a cybersecurity simulator, in accordance with an embodiment.

FIG. 4 illustrates a schematic diagram of a cybersecurity simulator 250 which identifies possible gaps in the network security system by simulating cyberattacks on a virtual network, separate from the network. The cybersecurity simulator 250 may be a software application executable by the computing device 100 (e.g., one or more of the computing devices 26, the cloud server 30, the supervisory control system 230, the central computing system of the NOC 238, or any other suitable computing system). In some embodiments, the computing device 100 running the cybersecurity simulator may not be part of the OT environment 10. For example, the cybersecurity simulator 250 may run on cloud computing resources (e.g., cloud-based servers, virtual machines) configured to communicate with a client device 252. In this way, the client device 252 may access or utilize the cybersecurity simulator 250 as a software platform (e.g., software as a service) via the internet. The client device 252 may be any device configured to provide (e.g., transmit) user inputs to the cybersecurity simulator 250 and receive outputs from the cybersecurity simulator 250. For example, the client device 252 may be any of the computing devices 26 or the centralized computing system of the NOC 238.

The user inputs to the cybersecurity system 250 may include configuration data 254. The configuration data 254 may include information indicative of a configuration of the network security system deployed in the OT environment 10. For example, the configuration data 254 may include user parameters, software versions, software dependency packages, drivers, containers, network metadata, and/or other software components used to implement the network security system. The configuration data 254 may also include information about a configuration of the network or the OT environment 10 itself, such as parameters of the computing devices 26, a physical or electrical layout of the OT environment, and a layout of ports on the network.

The configuration data 254 may further include a set of detection rules that define malicious or suspicious activity. For example, the detection rules may include certain conditions that, when fulfilled, would cause the network security system to identify network activity as a security threat (e.g., cyberattack). The detection rules may include signatures of known cyberattack techniques, such as specific code or patterns of code. In this way, the network security system may reference the detection rules when determining whether certain network activity is a security threat. For example, the network security system may analyze a packet, determine that the contents or form of the packet correspond to one or more signatures of known cyberattack techniques based on the detection rules, and identify (e.g., flag and/or classify) the packet as a possible security threat. At least a portion of the configuration data 254 or a copy thereof may be stored on the client device 252 in a configuration file. In some situations, the configuration file may be used as a backup to restore the configuration of the network security system. As such, the configuration data 254 may include information that enables reconfiguration or reconstruction of the network security system. In other embodiments, the configuration data 254 may not correspond to an actual network security system. Instead, the configuration data 254 may be used to generate a virtual network security system 256 that has characteristics (e.g., detection rules) of a hypothetical network security system to be tested. In this way, the user may evaluate the virtual network security system 256 having the configuration data 254 before implementing a network security system on the network of the OT environment 10.

Upon receiving the configuration data 254, the cybersecurity simulator 250 may execute (e.g., generate, utilize) a virtual network 258 as a model of the network of the OT environment 10. That is, the virtual network 258 may represent features, behaviors, events, devices, and/or actors of the network. As shown in FIG. 4, the virtual network 258 may include a virtual network security system 256, an cyberattack engine 260, and a target entity 262. These components may enable the virtual network 258 to simulate events and behaviors of the network of the OT environment or a hypothetical network. For example, the cyberattack engine 260 may correspond to a hypothetical or simulated attacker (e.g., hacker or other source of malicious attacks), the target entity 262 may represent one or more devices of the OT environment 10, and the virtual network security system 256 may correspond to the network security system of the OT environment 10.

The cyberattack engine 260 and the target entity 262 may function as a source and a destination, respectively, for simulated traffic on the virtual network 258. For example, the cyberattack engine 260 may generate one or more packets of data and transmit the packets to the target entity 262 within the virtual network 258 (e.g., via a port of the virtual network 258 or the target entity 262). Generally, simulated network activity generated by the cyberattack engine 260 may include simulated cyberattacks. For example, some simulated cyberattacks may be scenarios executed by a script or program. The script may provoke a response or extract information from the target entity 262, the virtual network 258, or the virtual network security system 256. Additionally, the script may perform subsequent actions in response to the provoked response or the extracted information. Other simulated cyberattacks may involve transmission of files containing signatures associated with known cyberattacks. The files may be executable or non-executable and may be transmitted in the form of packets across the virtual network 258 (e.g., to the target entity 262).

Whether the simulated cyberattacks include scenarios (e.g., scripts), transmitted files, or a combination thereof, the cyberattack engine 260 may generate the simulated cyber-attacks by referencing a catalog 264 of characteristics (e.g., tactics, techniques, procedures, signatures, activity patterns, and the like) that have been documented as being indicative of a cyberattack. The catalog 264 may be stored in a database accessible by the cyberattack engine 260. The database and/or the catalog 264 may be stored on the internet, in the cloud server 30, or on a storage device of the computer system running the cybersecurity simulator 250. The catalog 264 may be a publicly-available knowledge base (e.g., MITRE ATT&CK®) or a privately owned and curated knowledge base accessible by the cybersecurity simulator 258. The characteristics stored in the catalog 264 may include tactics and techniques of cyberattacks based on real-world observations. For example, the catalog 264 may include definitions, descriptions, examples, code, and/or instructions related to various cyberattack techniques, such as port scanning, container deployment, keylogging, and denial of service (DOS). In other words, the catalog 264 includes reference materials that enable the cyberattack engine 260 to generate simulated cyberattacks using techniques that correspond to known cyberattacks. In some embodiments, the catalog 264 may contain the data (e.g., files, scripts, and/or packets) to be transmitted to the target entity 262, and the cyberattack engine 260 may simply retrieve the data from the catalog 264 and transmit the data to the target entity 262.

The target entity 262 may be any virtual construct (e.g., object, model) that represents a targetable part of the OT environment 10, such as the industrial automation controller 12, the computing device 26, a server, an edge device, an internet of things (IoT) device, etc. In some embodiments, the target entity 262 may receive the data transmitted from the cyberattack engine 260, but otherwise may not actively perform any operations. For example, the target entity 262 may be a passive dummy (e.g., stand-in) in place of a hypothetical industrial automation controller, without performing any simulated functions of the industrial automation controller 12, aside from receiving data. In other embodiments, the target entity 262 may indeed simulate a function or structure of an actual device to emulate more closely real-world operating conditions.

As the cyberattack engine 260 transmits the data, including the simulated cyberattacks, to the target entity 262, the virtual network security system 254 may monitor the data in an attempt to detect the simulated cyberattacks. The virtual network security system 254 may be configured based on the configuration data 254 received from the client device 252. As discussed above, the configuration data 254 may include information used to configure the network security system of the OT environment 10. In a similar manner, the configuration data 254 may also enable the cybersecurity simulator 250 to configure and run the virtual network security system 256 such that the virtual network security system 256 imitates functions, abilities, and vulnerabilities of the network security system. In other words, the virtual network security system 256 may be a copy, a digital twin, a virtual instance, an image, an emulator, or a derivative of the network security system, generated based on the configuration data 254. In this way, the user may provide the configuration data 254 to enable the cybersecurity simulator 250 to generate the virtual network security system 256 in a way that mirrors capabilities of the network security system of the OT environment 10 or capabilities of a hypothetical network security system configured based on the configuration data 254.

In some embodiments, the virtual network security system 256 may have a base configuration with a base set of detection rules instead of or in addition to the set of detection rules included in the configuration data 254 provided by the user. For example, the virtual network security system 256 may be a third-party application that is pre-configured to operate according to the base set of detection rules. Configuration data 254 provided by the user may be used to augment the base set of detection rules. In other embodiments, the cybersecurity simulator 250 may simulate cyber-attacks against the virtual network security system 256 with only the base configuration (i.e., without the configuration data 254 provided by the user).

The virtual network security system 256 may operate according to the detection rules of the configuration data 254. For example, the virtual network security system 256 may determine that a packet transmitted from the cyberat-tack engine 260 is malicious if the packet exhibits characteristics of malicious activity as defined by the detection rules. It is noted that the characteristics of malicious activity defined by the detection rules may differ from the characteristics of malicious activity stored in the catalog 264 and used to generate the simulated cyberattacks. For example, the catalog 264 may include a cyberattack technique that is not included in the detection rules. Consequently, a simulated cyberattack generated based on such a cyberattack technique may not be detected by the virtual network security system 256. As such, a gap may exist between cyberattacks that can be simulated by the cyberattack engine 260 and cyberattacks that can be detected by the virtual network security system 256. Identifying the subset of cyberattacks that fall in this gap may provide useful information for evaluating and improving the performance of the network security system.

In view of the above, the virtual network security system 256 may either detect or not detect a simulated cyberattack. In other embodiments, the virtual network security system 256 may classify or rate the simulated cyberattack according to a perceived type or severity of the simulated cyberattack. For example, the virtual network security system 256 may classify a simulated cyberattack as a high-threat DOS attack or as a low-risk network activity. For some of the simulated cyberattacks, the virtual network security system 256 may output an incorrect classification. For example, the virtual network security system 256 may incorrectly classify a packet containing a security exploit as a non-threat. Such a fault of the virtual network security system 256 may indicate a gap in detection capabilities of the network security system caused by a lack of a detection rule in the configuration data that would identify the security exploit.

The cyberattack engine 260 may transmit each simulated cyberattack to the target entity 262 in succession. For example, the cyberattack engine 260 may transmit a first set of packets composing a first simulated cyberattack, followed by a second set of packets composing a second simulated cyberattack, followed by a third set of packets, and so on. For each simulated cyberattack, the virtual network security system 256 may output an alert 266 indicating whether a threat was detected. For example, if the first simulated cyberattack triggers the detection rules of the virtual network security system 256, then the virtual network security system 256 may output an alert 266 indicative of detection of the threat. Inversely, the virtual network security system 256 may output an alert 266 indicative of non-detection of the threat if the first simulated cyberattack does not trigger the detection rules. The alert 266 may cause the cyberattack engine 260 to transmit a subsequent simulated cyberattack (e.g., a second set of packets) to the target entity 262. In this way, the virtual network security system 256 may provide the alert as feedback to the cyberattack engine 260, causing the cyberattack engine 260 to transmit each simulated cyberattack in succession upon receiving the alert 266. Additionally, one or more of the alerts may be presented to the user as one or more notifications. In some embodiments, the notification may be provided when the alert 266 indicates non-detection of the simulated cyberattack. The number of simulated cyberattacks may be set by the user, and/or the simulated cyberattacks may be transmitted continually for a period of time. In other embodiments, the cyberattack engine 260 may deploy multiple simulated cyberattacks in parallel. For example, the cyberattack engine 260 may simultaneously transmit a batch of simulated cyberattacks to the target entity 262, and the virtual network security system 256 may analyze the simulated cyberattacks en masse.

Upon receiving a command to terminate or upon reaching a terminating condition, such as a set number of cyberattacks, a set range of cyberattacks, a statistical confidence threshold, a period of time elapsed, or another suitable condition, the cyberattack simulator 250 may stop creating and detecting the simulated cyberattacks. Then, the cyberattack simulator 250 may generate a report 268 of a performance of the virtual network security system 256. The report 268 may include a list of the simulated cyberattacks that indicates whether each simulated cyberattack was correctly identified as a threat by the virtual network security system 256. The report 268 may also include metrics, such as aggregate statistics regarding the performance of the virtual network security system 256 at detecting the simulated cyberattacks. The metrics may be determined, sorted, and/or visualized based on categories of the simulated cyberattacks, such as a type, severity, rarity, or other quality of the simulated cyberattacks. In some embodiments, the report may identify vulnerabilities associated with the presence of ransomware or malware, the presence of one or more viruses, use of weak or sub-standard cryptography techniques, outdated software or firmware, the presence of manipulated firmware, use of insecure engineering and/or communication protocols, use of insecure communication, insecure remote access to devices, remote code execution, compromised credentials, weak passwords, denial of service, configuration manipulation, file manipulation, logic manipulation, and so forth. Additionally, the report may include recommendations for improving the network security system, such as recommended detection rules to add to the configuration data 254. The recommended detection rules may correspond to certain cyberattack techniques of the catalog 264. In some embodiments, the recommended detection rules may be generated using artificial intelligence and/or a machine learning algorithm trained on data from the OT environment, other OT environments, and/or other data sources (e.g., one or more external network security data sources, one or more third party network security services, and so forth).

Figure 5:
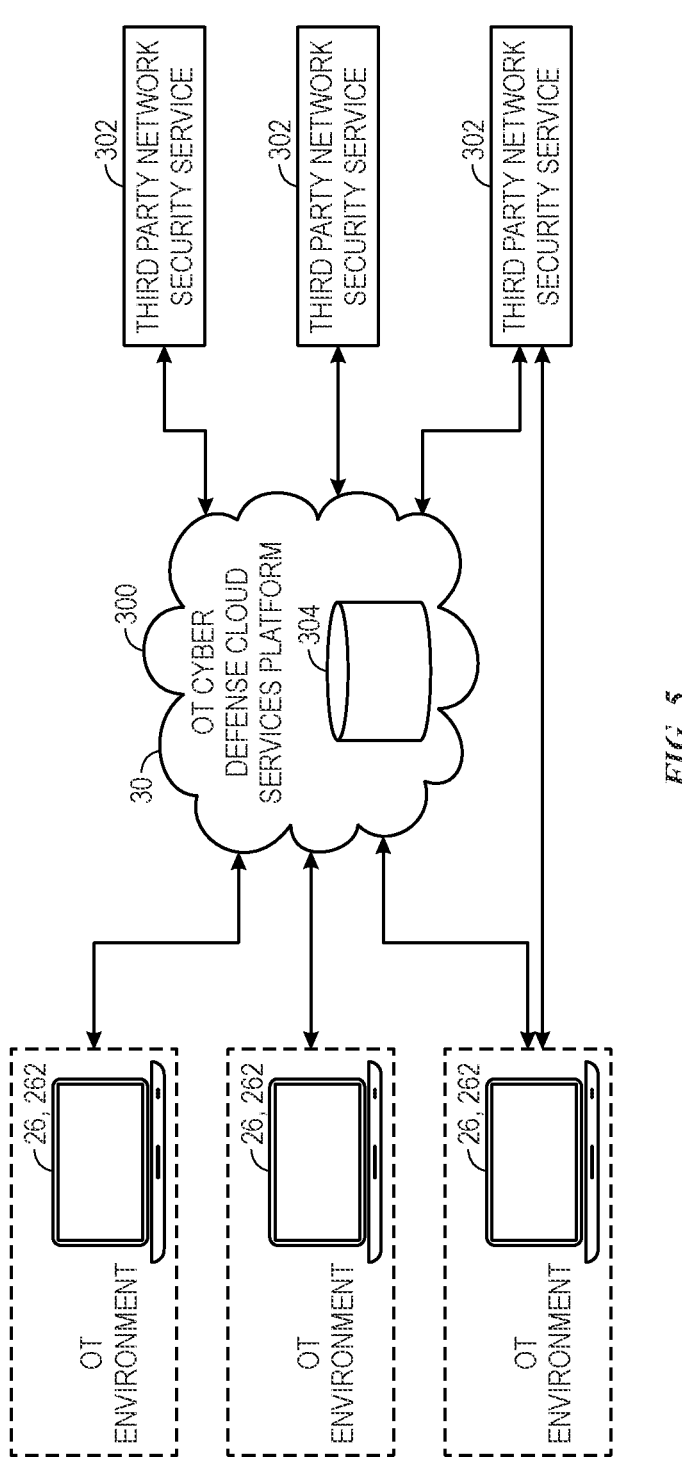
FIG. 5 is a schematic diagram of an OT cyber defense cloud service platform, which may include the cybersecurity simulator of FIG. 4, in accordance with an embodiment.

FIG. 5 is a schematic diagram of an OT cyber defense cloud services platform 300, which may include the cyber-security simulator 250 of FIG. 4. The OT cyber defense cloud services platform 300 shown in FIG. 5 runs on a cloud server 30, however, in some embodiments, the OT cyber defense cloud services platform 300 may run on a computing device 26, 262 within an OT environment 10, on an on-prem server in or near the OT environment 10, a remote server, or some combination thereof. Accordingly, in some embodiments, the OT cyber defense cloud services platform 300 may include instantiations within or communicatively coupled to one or more OT environments 10, on a remote server, and/or on a cloud server.

The OT cyber defense cloud services platform 300 may include the cybersecurity simulator 250 shown in FIG. 4. As described with regard to FIG. 4, users may upload configuration data to the OT cyber defense cloud services platform 300, which may, via the cybersecurity simulator 250, determine detection rules based on the configuration data, generate a virtual network, configured using the configuration data, and simulate cyberattacks against one or more target entities within the virtual network via an attack engine. The cybersecurity simulator 250 may then detect the simulated cyberattacks and generate one or more performance reports indicating which simulated cyberattacks were detected and which cyberattacks were not detected.

In response to receiving the report, a user may adjust one or more existing rules and/or generate one or more new rules that, when implemented, would result in detection of the undetected cyberattacks. Accordingly, data indicative of the adjustments to the one or more existing rules and/or the newly generated rules may be transmitted to the OT cyber defense cloud services platform 300 via a computing device 26, 262 within or communicatively coupled to the OT environment 10. In some embodiments, configuration data, the report, and/or data indicative of the undetected cyberattacks may also be transmitted.

In some implementations, customers may utilize one or more third party network security services 302 to monitor and/or secure their OT and/or IT networks. The customer may provide the adjustments to the one or more existing rules and/or the newly generated rules directly to the one or more third party network security services 302, or the customer may provide the adjustments to the one or more existing rules and/or the newly generated rules to the OT cyber defense cloud services platform 300, which may provide the adjustments to the one or more existing rules and/or the newly generated rules to the one or more third party network security services 302, or configure tools provided by the one or more third party network security services 302. As such, users managing the OT environments 10 may configure tools provided by the one or more third party network security services 302, or the OT cyber defense cloud services platform 300 may configure tools provided by the one or more third party network security services 302. In such embodiments the tools provided by the one or more third party network security services 302 may be transparent or opaque to the user. For example, in some embodiments, the user may be able to configure tools provided by the one or more third party network security services 302 within the OT cyber defense cloud services platform 300, whereas in other embodiments, the OT cyber defense cloud services platform 300 may configure tools provided by the one or more third party network security services 302 in a way that is not seen or otherwise observable by the user.

The OT cyber defense cloud services platform 300 may be configured to analyze the received data (e.g., reports generated by the cybersecurity simulator, data from simulated attacks, data indicative of the adjustments to the one or more existing rules and/or the newly generated rules, configuration data, etc.) and recommend one or more adjustments to one or more existing rules and/or new rules to address the undetected cyberattacks. Recommendations may be based, for example, on data stored in a database 304 operated and/or maintained by the OT cyber defense cloud services platform 300 based on data generated by agents, data generated by/for other OT environments, data from external network security data sources, data from third party network security services, etc. In some embodiments, recommendations may be generated using artificial intelligence and/or a machine learning algorithm. For example, an undetected simulated cyberattack in a first OT environment 10 may indicate that the OT environment is susceptible to a first vulnerability. The OT cyber defense cloud services platform 300 may reference data from the same or a different OT environment 10, one or more databases 304 internal to the OT cyber defense cloud services platform 300, external network security data sources, data from third party network security services 302, or some combination thereof, to develop a recommendation for addressing the vulnerability. In some embodiments, the internal database 304 may be periodically updated based on data pushed from and/or pulled from various data sources (e.g., one or more OT environments 10, external network security data sources, data from third party network security services 302, or some combination thereof). For example, when a cyberattack is added to the catalog 264 shown in FIG. 4, the internal database 304 may be updated with information about how to address the vulnerability exploited by the cyberattack. Such vulnerabilities may include, for example, the presence of ransomware or malware, the presence of one or more viruses, use of weak or sub-standard cryptography techniques, outdated software or firmware, the presence of manipulated firmware, use of insecure engineering and/or communication protocols, use of insecure communication, insecure remote access to devices, remote code execution, compromised credentials, weak passwords, denial of service, configuration manipulation, file manipulation, logic manipulation, and so forth.

The recommended adjustments to the one or more existing rules and/or new rules to address the undetected cyberattacks may be more specific to the vulnerability being exploited than the OT environment and thus be widely applicable in many OT environments. However, in other instances, the recommended adjustments to the one or more existing rules and/or new rules to address the undetected cyberattacks may be more specific to a particular OT environment and may thus only be applicable to similarly configured OT environments or OT environments having characteristics in common. Accordingly, OT environment configurations may be considered when generating the recommended adjustments to the one or more existing rules and/or new rules to address the undetected cyberattacks. In some embodiments, recommendations may be generated using artificial intelligence and/or a machine learning algorithm trained on data from the OT environment, other OT environments, and/or other data sources (e.g., one or more external network security data sources, one or more third party network security services, and so forth).

When data pertaining to undetected cyberattacks in an OT environment 10 is received, the internal database 304 may be updated to reflect the discovered vulnerability. In some cases, the internal database 304 may be updated to include configuration data, or other information about the OT environment. In some cases, external network security data sources, and/or third-party network security services 302 may be referenced in an attempt to identify, diagnose, and/or address the discovered vulnerability.

If possible solutions to the discovered vulnerability are found, the internal database 304 may be updated to reflect the possible solutions. Further, the solutions may be provided to the OT environment. Similarly, if adjustments to one or more existing rules and/or new rules to address the undetected cyberattacks are implemented in the OT environment, an indication may be provided to the OT cyber defense cloud services platform 300.

Whether subsequent simulated cyberattacks are detected may be indicative of whether the adjustments to one or more existing rules and/or new rules to address the undetected cyberattacks were successful in addressing the vulnerability. Once subsequent simulated cyberattacks are performed, whether or not the adjustments to one or more existing rules and/or new rules were successful in addressing the vulnerability may be provided to the OT cyber defense cloud services platform 300. For example, the internal database 304 may be updated to indicate whether adjustments to one or more existing rules and/or new rules were successful in addressing the discovered vulnerability. In some embodiments, the OT cyber defense cloud services platform 300 may relay information about successful or unsuccessful attempts to address the discovered vulnerability to other OT environments 10, external network security data sources, and one or more third party network security services 302.

When the same vulnerability is discovered via an undetected simulated cyberattack for a second OT environment 10, which may be operated by a different customer or entity than the first OT environment, the OT cyber defense cloud services platform 300 may determine that the second OT environment has one or more characteristics in common with the first OT environment such that the adjustments to one or more existing rules and/or new rules to address the vulnerability in the first OT environment may be successful in addressing the vulnerability in the second OT environment. Accordingly, the OT cyber defense cloud services platform 300 may be configured to identify similarities between the first and second OT environments 10 (e.g., based on their configuration data), identify that the first and second OT environments 10 experienced the same or similar vulnerabilities, identify adjustments to one or more existing rules and/or new rules that were successful in addressing the vulnerability in the first OT environment, and recommend the adjustments to one or more existing rules and/or new rules to address the vulnerability in the second OT environment 10.

As previously discussed, if the recommended adjustments to one or more existing rules and/or new rules are successful or unsuccessful in addressing the vulnerability, the second OT environment 10 may transmit an indication of whether or not the recommended adjustments to one or more existing rules and/or new rules were successful in addressing the vulnerability. The internal database 304 may be updated to identify the discovered vulnerability, the adjustments to one or more existing rules and/or new rules to address the vulnerability, and indicate whether the adjustments to one or more existing rules and/or new rules were successful in addressing the vulnerability. In some cases, the OT cyber defense cloud services platform 300 may provide updates to the external network security data sources, data from third party network security services 302, or some combination thereof.

FIG. 6 illustrates a process 400 for operating the cybersecurity simulator 250 (e.g., via the computing device 100), in accordance with embodiments described herein. Although the following description of the process 400 is described as being performed by the computing device 100 and in a particular order, it should be understood that any suitable processing device may perform the steps of the process 400, and further that the steps of the process 400 may be performed in any suitable order.

Referring now to FIG. 6, at block 402, the computing device 100 may receive the configuration data 254. The configuration data 254 may correspond to a configuration of an actual network security system of the OT environment 10. For example, the configuration data 254 may include the detection rules used by the actual network security system to detect actual cyberattacks. In other embodiments, the configuration data 254 may include a set of detection rules selected by the user for testing. In any case, the user may transmit the configuration data 254 from the client device 252 to the computing device 100 via the internet, a private network, a removable memory device, or other suitable method of communication.

At block 404, the computing device 100 may determine the detection rules based on the configuration data 254. For example, the detection rules may be stored in a data structure of the configuration data 254, and the computing device 100 may extract the detection rules from the data structure. In some embodiments, the detection rules may be implied by the configuration data 254, and the computing device 100 may analyze the configuration data 254 to determine the detection rules.

At block 406, the computing device 100 may configure or generate the virtual network 258, or a portion thereof, such as the virtual network security system 256, the cyberattack engine 260, and the target entity 262. In some embodiments, the virtual network 258 may be generated before block 402 and block 404. For example, if the virtual network 258 is already generated at block 406, then upon receiving the configuration data 254 and determining the detection rules, the computing device 100 may proceed to block 408 to configure the virtual network security system 256 based on the configuration data 254. In this way, the virtual network security system 256 may operate based on the detection rules provided by the user.

At block 410, the computing device 100 may instruct the cyberattack engine 260 to generate simulated cyberattacks based on the catalog 254 of known cyberattack techniques. For example, the cyberattack engine 260 may reference definitions, descriptions, instructions, examples, code, and other information in the catalog 254 to create and deploy simulated cyberattacks.

At block 412, the cyberattack engine 260 may deploy (e.g., run, execute) the simulated cyberattacks. For example, the cyberattack engine 260 may transmit packets or sets of packets to the target entity 262. Each set of packets (e.g., first set of packets, second set of packets, etc.) may encompass one or more simulated cyberattacks (e.g., first simulated cyberattack, second simulated cyberattack, etc.). The cyberattack engine 260 may deploy the simulated cyberattacks in succession, with each successive simulated cyberattack being deployed after the virtual network security system 256 outputs an alert for the previous simulated cyberattack.

At block 414, the virtual network security system 256 may attempt to detect the simulated cyberattacks. For example, the virtual network security system 256 may analyze the packets to determine whether the packets exhibit characteristics of malicious activity as defined by the detection rules. In other words, a subset of the simulated cyberattacks may trigger the detection rules and cause the virtual network security system 256 to detect (e.g., identify, classify, categorize) each simulated cyberattack of the subset. For example, the virtual network security system 256 may identify a simulated cyberattack as a threat, not as a threat, or as having a threat level selected from a range. Alternatively, the virtual network security system 256 may assign a risk rating to the simulated cyberattack or classify the simulated cyberattack within a category of a plurality of categories. Upon detection or classification of a simulated cyberattack, the virtual network security system 256 may output the alert 266 indicative of the detection. If the virtual network security system 256 does not correctly detect or classify the simulated cyberattack (e.g., within a threshold period of time), then the virtual network security system 256 may output the alert 266 indicative of the non-detection of the simulated cyberattack. In each or either case, the alert 266 may be presented to the user as a notification to indicate that the virtual network security system 256 detected or failed to detect one or more simulated cyberattacks.

At block 416, the computing device 100 may output the report 268 of results of the simulated cyberattacks. The report 268 may include one or more lists of the simulated cyberattacks that indicate whether each simulated cyberattack was correctly detected by the virtual network security system 256. In some embodiments, the report 268 may include a first list of detected simulated cyberattacks and a second list of undetected simulated cyberattacks. Additionally, the report 268 may include metrics indicative of overall performance of the virtual network security system 256 or performance of the virtual network security system 256 in particular aspects. Furthermore, the report 268 may include recommendations to modify the configuration data 254, including the detection rules, to improve detection of cyberattacks. The recommendations may be retrieved from the catalog 264 or generated based on the catalog 264.

At block 418, the computing device 100 may generate updated detection rules based on the undetected simulated cyberattacks and/or the recommendations of the report. The updated detection rules may help the user to implement improvements to the configuration data 254 of the network security system. In some embodiments, the computing device 100 may modify the configuration data 254 to incorporate the updated detection rules and output the modified or new configuration data to the client device 252. The new configuration data, having the updated detection rules, may be exported from the cybersecurity simulator and implemented in the network security system. For example, the new configuration data may replace or augment the configuration data 254 used to configure the network security system. In this way, the network security system, using the updated detection rules, may detect cyberattacks that it was unable to detect previously.

Figure 7:
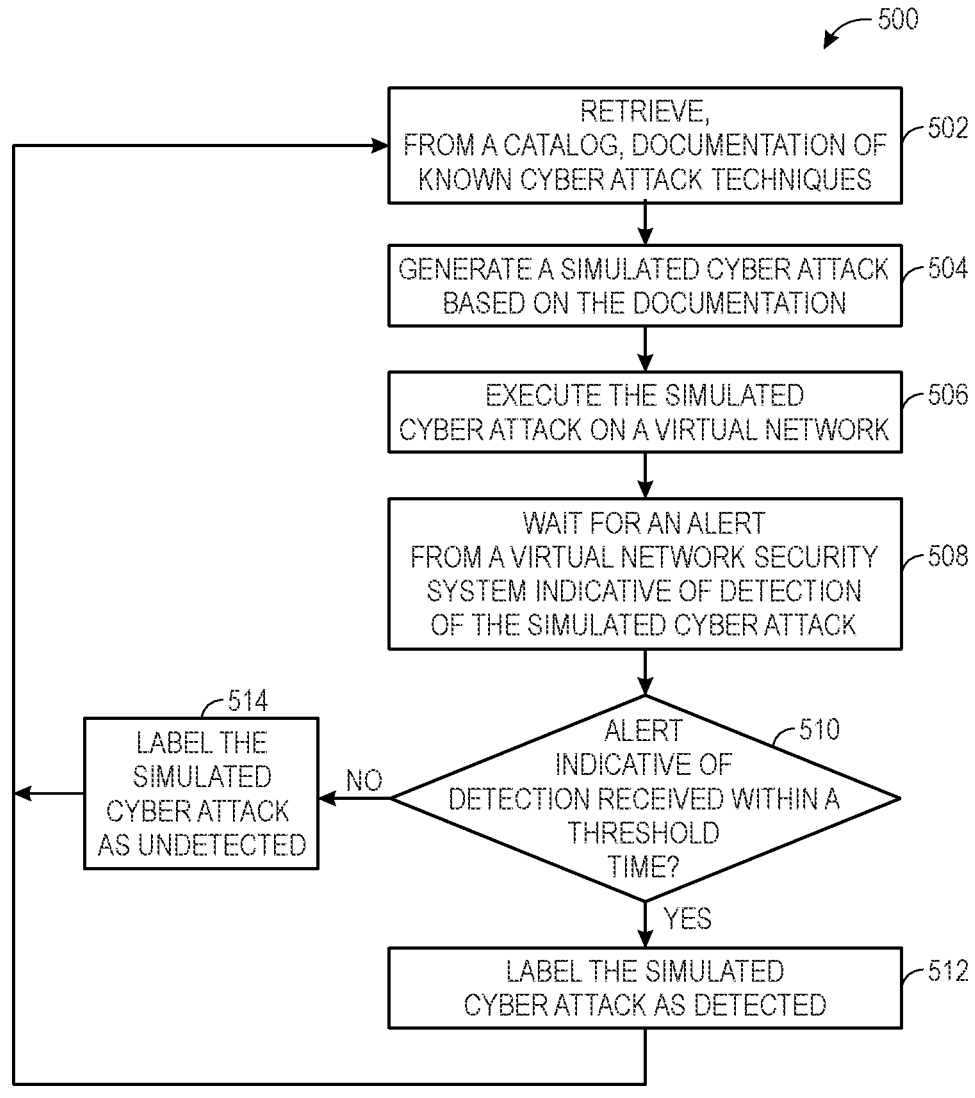
FIG. 7 is a flowchart of a process for simulating cyberattacks via an cyberattack engine, in accordance with an embodiment.

FIG. 7 illustrates a process 500 for the cyberattack engine 260 to generate and deploy simulated cyberattacks, in accordance with embodiments described herein including the process 400 described above. Although the following description of the process 500 is described as being performed by the cyberattack engine 260 running on the computing device 100 and in a particular order, it should be understood that any suitable processing device may perform the process 500, and that the steps of the process 500 may be performed in any suitable order.

Referring now to FIG. 7, at block 502, the cyberattack engine 260 may retrieve, from the catalog 264, documentation regarding known cyberattack techniques. The documentation may include descriptions, definitions, instructions, code elements, examples, and other information to assist the cyberattack engine 260 in generating the simulated cyberattacks. In some embodiments, the cyberattack engine 260 may determine, based on the documentation from the catalog 264, characteristics or signatures of the known cyberattack techniques, such as specific code elements, patterns of network activity, and other identifying features that have been observed in cyberattacks. The catalog 264 may reference a publicly available knowledge base, such as MITRE ATT&CK, and/or the catalog 264 may be a privately maintained knowledge base of cyberattacks. In some embodiments, the catalog 264 may be stored as a database on the memory 106 of the computing device 100. Alternatively, the catalog 264 may be accessed via the internet or another suitable network.

At block 504, the cyberattack engine 260 may generate a simulated cyberattack based on the documentation retrieved from the catalog 264. For example, the simulated cyberattack may include one or more packets of data to be transmitted on the virtual network 258. The simulated cyberattack may exhibit the characteristics of known cyberattack techniques, as determined or retrieved in block 502. As such, the simulated cyberattack may be detected by the virtual network security system 256 based on these characteristics.

At block 506, the cyberattack engine 260 may execute the simulated cyberattack on the virtual network 258. In some embodiments, the cyberattack engine 260 may transmit the one or more packets to the target entity 262. Such transmission of the packets may constitute simulated network activity emulating network activity that may occur on the actual network of the OT environment 10. However, the simulated network activity exhibits the characteristics of known cyberattack techniques and thereby constitutes a simulated cyberattack.

At block 508 and block 510, the cyberattack engine 260 may wait for an alert (e.g., alert 266) from the virtual network security system 256 indicating that the simulated cyberattack was detected by the virtual network security system 256. By waiting for the alert before proceeding, the cyberattack engine 260 may execute each simulated cyberattack in succession. Accordingly, the virtual network security system 256 may be tested with respect to each simulated cyberattack individually. In some embodiments, the cyberattack engine 260 may continue to deploy the simulated cyberattack until the alert is received.

If an alert indicative of detection of the simulated cyberattack is received, then the process 500 may proceed from block 510 to block 512, where the simulated cyberattack may be recorded as being detected by the virtual network security system 256. For example, the simulated cyberattack may be labeled as a detected cyberattack. If the alert indicative of detection is not received within a threshold period of time, then the process 500 may proceed from block 510 to block 514 cyberattack simulator 250 may label the simulated cyberattack as an undetected cyberattack. Additionally, the cyberattack engine 260 may receive an alert indicating that the simulated cyberattack was not detected, in which case the simulated cyberattack may be labeled as an undetected cyberattack.

After the simulated cyberattack is determined (e.g., labeled) to be detected or undetected, the process 500 may return to block 502, and the cyberattack engine 260 may retrieve additional documentation from the catalog 264 to generate the next simulated cyberattack. In some embodiments, the process 500 may return to block 504 instead, where the cyberattack engine may generate the next simulated cyberattack based on the documentation previously retrieved from the catalog 264 at block 502.

Figure 8:
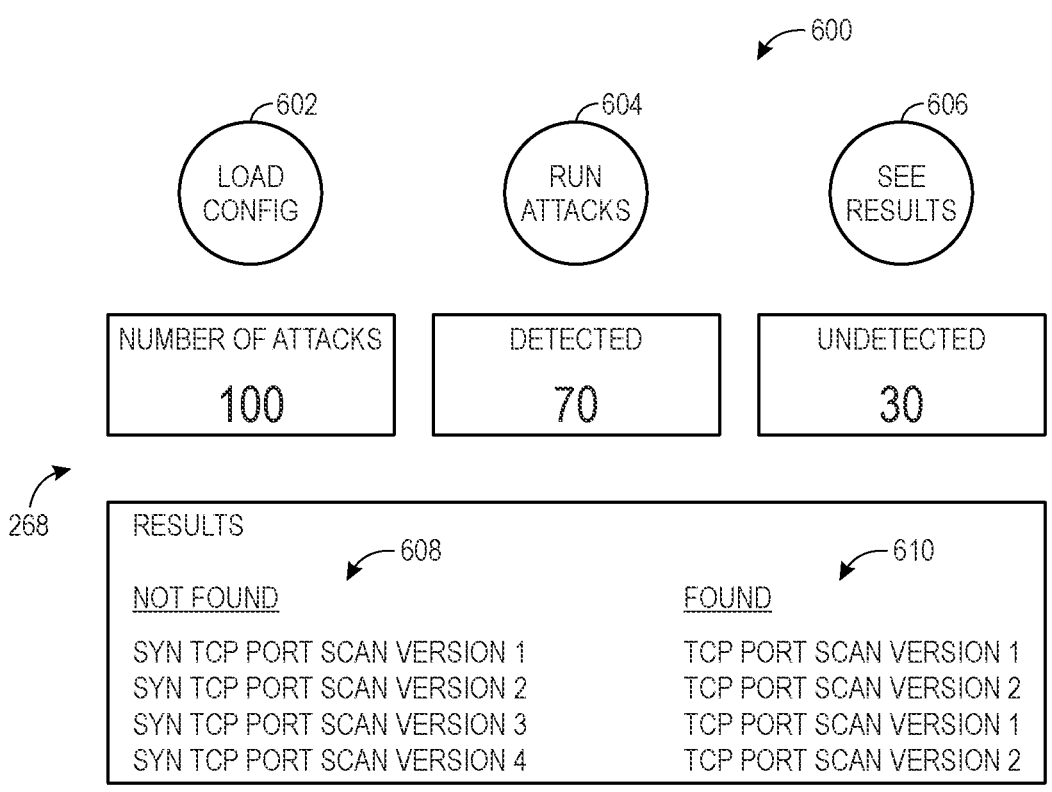
FIG. 8 is an illustration of a graphical user interface (GUI) of the cybersecurity simulator of FIG. 4, in accordance with an embodiment.

FIG. 8 illustrates a user interface 600 which may be displayed on the client device 252 or the computing device 100. The user interface 600 may include a menu of selectable actions 602, 604, and 606 allowing the user to load configuration data 254 to the cybersecurity simulator 250, execute the simulated attacks, and see the results, respectively. In the illustrated embodiment, selectable action 606 is selected, and the report 268 is displayed after the simulated cyberattacks have been deployed. As shown, the report 268 includes the number of simulated cyberattacks performed, the number of simulated cyberattacks that were detected, and the number of simulated cyberattacks that were undetected. Additionally, the report 268 includes a first list 608 of simulated cyberattacks that were undetected and a second list 610 of simulated cyberattacks that were detected.

FIG. 9 is a flowchart of a process 700 for operating the OT cyber defense cloud service platform 300 described with regard to FIG. 5. At block 702, data is received that is associated with one or more simulated cyberattacks on a first OT environment. As previously described, the data may be received from a local instantiation of the cybersecurity simulator installed on-prem in the first OT environment, an instantiation of the cybersecurity simulator running in the cloud, or some combination thereof. The data may include, for example, the report generated by the cybersecurity simulator, data associated with simulated cyberattacks on the virtual network and whether or not the simulated cyberattacks were detected or not, configuration data for the first OT environment, other characteristic information about the first OT environment and/or the customer operating the OT environment, and so forth.

At block 704, one or more updates to security rules generated in response to the one or more simulated cyberattacks on the first OT environment are received. The updates may include, for example, updates to rules that were manually created by a user, updates to rules that were recommended by the OT cyber defense cloud services platform and accepted, rules that were recommended by the OT cyber defense cloud services platform and modified before implementation, and so forth. As such, the received one or more updates to the security rules are the updates to the security rules that were actually implemented in the OT environment in response to the one or more simulated cyberattacks.

At block 706, one or more additional updates to the security rules are generated based on the received one or more updates to the security rules and/or the received data associated with the one or more simulated cyberattacks. For example, the OT cyber defense cloud services platform may consider the received data associated with the one or more simulated cyberattacks in view of the one or more updates to the security rules that were implemented and generate one or more additional updates to the security rules that may further improve the cybersecurity of the OT environment. In generating the one or more additional updates to the security rules, the OT cyber defense cloud services platform may consider data stored in an internal database, which may be based on data received from the first OT environment, one or more other OT environments, one or more external network security data sources, one or more third party network security services, and so forth. Further, in generating the one or more additional updates to the security rules, the OT cyber defense cloud services platform may transmit data to and/or receive data from one or more external network security data sources and/or one or more third party network security services. In some embodiments, the one or more additional updates to the security rules may be transmitted to the OT environment as recommendations that may be accepted and implemented as-is, modified and implemented, or declined. In some embodiments, the recommendations may be packaged as a file including updated security rules or updates to security rules that is transmitted to one or more devices in the OT environment, save din memory, and executed.

At block 708, the one or more updates to the security rules from blocks 704 and 706 may be determined to be possibly applicable to other OT environments. For example, if the one or more updates to the security rules from blocks 704 and 706 are unique to the customer operating the OT environment, and unlikely to be used by another customer operating another OT environment, or the operator of the OT environment has indicated that it does not wish the share data with other customers, the OT cyber defense cloud services platform may determine that the one or more updates to the security rules from blocks 704 and 706 are not applicable to other OT environments. However, if the one or more updates to the security rules from blocks 704 and 706 address vulnerabilities that are likely to arise in other OT environments and be applicable in other OT environments, the OT cyber defense cloud services platform may determine that the one or more updates to the security rules from blocks 704 and 706 are may be applicable to other OT environments.

At block 710, the one or more updates to the security rules from blocks 704 and 706 may be added to a general rule set, which may be stored in an internal database and used to generate recommendations for rules and addressing vulnerabilities in other OT environments. As discussed above, the OT cyber defense cloud services platform may be configured to use the internal database, including the general rule set to generate recommendations for rules to be implemented in OT environments to follow best practices and/or to address specific vulnerabilities. In some embodiments, recommendations may be generated using artificial intelligence and/or a machine learning algorithm trained on data from the OT environment, other OT environments, and/or other data sources (e.g., one or more external network security data sources, one or more third party network security services, and so forth).

At block 712, one or more characteristics of the first OT environment may be identified and added to the general rule set and/or the internal database to provide context for the one or more updates to the security rules from blocks 704 and 706 added to a general rule set and assist in determining their applicability to other OT environments and/or situations.

At block 714, one or more updates to security rules may be provided to a second OT environment having one or more characteristics in common with the first OT environment. For example, the OT cyber defense cloud services platform may receive data associated with one or more simulated cyberattacks in the second OT environment. The OT cyber defense cloud services platform may recognize one or more shared characteristics between the first OT environment and the second OT environment and determine that updates to rules that were made in the first OT environment may also be applicable in the second OT environment. Accordingly, the OT cyber defense cloud services platform may generate one or more recommended one or more updates to security rules based on the one or more updates to the security rules from blocks 704 and 706 for the first OT environment, along with other data stored in the internal database, one or more external network security data sources, and/or one or more third party network security services.

Though FIGS. 6, 7, and 9 depict flow charts for processes that include blocks shown in a sequence, it should be understood that these are merely example embodiments and that other embodiments are envisaged that may modify or partially perform blocks shown, omit some of the block shown, add additional blocks that are not shown, or perform the blocks in a different order than is shown. Accordingly, it should be understood that the flow charts of the processes shown in FIGS. 6, 7, and 9 are merely examples and not intended to be limiting.

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is intended to cover all modifications, equivalents, and alternatives falling within the spirit and scope of the present disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform] ing [a function] . . . " or "step for [perform] ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A non-transitory computer readable medium storing instructions that, when executed by a processor, cause the processor to perform operations comprising:

retrieving, from a catalog a set of characteristics associated with a cyberattack;

generating a plurality of packets having the set of cyberattack characteristics, wherein the plurality of packets collectively simulate the cyberattack;

transmitting the plurality of packets over a virtual operational technology (OT) network comprising a virtual network security system;

receiving an alert indicating whether one or more of the plurality of packets was detected by the virtual network security system;

updating the catalog to include one or more new characteristics associated with the cyberattack; and updating an internal database to include one or more new characteristics associated with the virtual OT network.

2. The non-transitory computer readable medium of claim 1, wherein the virtual OT network comprises a target entity, and the operations comprise transmitting the plurality of packets to the target entity via the virtual OT network.

3. The non-transitory computer readable medium of claim 1 comprising:

transmitting a first packet of the plurality of packets, wherein the first packet simulates a first cyberattack;

receiving an alert indicative of detection of the first packet by the virtual network security system; and transmitting a second packet of the plurality of packets in response to the alert indicative of detection of the first packet, wherein the second packet simulates a second cyberattack.

4. The non-transitory computer readable medium of claim 3, wherein the second packet is configured to be transmitted following the first packet if no alert is received for the first packet after a threshold period of time.

5. The non-transitory computer readable medium of claim 1, wherein the virtual network security system comprises an intrusion detection system configured to detect a subset of the plurality of packets based on a set of detection rules.

6. The non-transitory computer readable medium of claim 1, wherein the operations comprise:

generating an additional plurality of packets having the new characteristics associated with the cyberattack or an additional cyberattack.

7. The non-transitory computer readable medium of claim 1, wherein the one or more new characteristics associated with the virtual OT network comprise a user parameter, a software version, a software dependency package, a driver, a container, a network metadata, a parameter of a computing device, a physical layout, an electrical layout, and a layout of ports, or a combination thereof.

8. A method comprising:

generating a plurality of simulated cyberattacks based on one or more cyberattack techniques retrieved from a catalog;

executing the plurality of simulated cyberattacks on a virtual operational technology (OT) network comprising a virtual network security system configured to monitor the virtual OT network;

determining whether each simulated cyberattack of the plurality of simulated cyberattacks was detected by the virtual network security system;

updating the catalog with one or more new characteristics of the cyberattack based on feedback from the virtual network security system; and updating an internal database to include one or more new characteristics associated with the virtual OT network.

9. The method of claim 8, wherein one or more simulated cyberattacks of the plurality of simulated cyberattacks comprise a signature indicative of at least one of the one or more cyberattack techniques.

10. The method of claim 9, wherein executing the plurality of simulated cyberattacks comprises transmitting one or more packets containing the signature on the virtual OT network.

11. The method of claim 8, wherein the executing the plurality of simulated cyberattacks comprises executing one or more scripts configured to provoke a response from the virtual OT network.

12. The method of claim 8, wherein the virtual network security system is configured based on a set of detection rules to detect a subset of the plurality of simulated cyberattacks.

13. The method of claim 8, and wherein the virtual network security system is configured to monitor network traffic to a target entity of the OT virtual network, and wherein the plurality of simulated cyberattacks is executed against the target entity.

14. The method of claim 8, comprising receiving an alert from the virtual network security system indicating whether one or more of the simulated cyberattacks were detected by the virtual network security system.

15. A non-transitory computer readable medium storing instructions that, when executed by a processor, cause the processor to perform operations comprising:

referencing a catalog of cyberattack techniques;

generating a plurality of simulated cyberattacks based on one or more of the cyberattack techniques;

executing the plurality of simulated cyberattacks on a virtual network comprising a virtual network security system;

determining whether each simulated cyberattack of the plurality of simulated cyberattacks was detected by the virtual network security system;

generating an indication of which of the plurality of simulated cyberattacks were detected by the virtual network security system and which of the plurality of simulated cyberattacks were not detected by the virtual network security system;

updating one or more characteristics of the cyberattack techniques based on the indication of which of the plurality of simulated cyberattacks were detected by the virtual network security system and which of the plurality of simulated cyberattacks were not detected by the virtual network security system; and updating one or more characteristics of the virtual network to an internal database based on the indication of which of the plurality of simulated cyberattacks were detected by the virtual network security system and which of the plurality of simulated cyberattacks were not detected by the virtual network security system.

16. The non-transitory computer readable medium of claim 15, wherein one or more simulated cyberattacks of the plurality of simulated cyberattacks comprises a signature indicative of one or more of the cyberattack techniques, and wherein executing the plurality of simulated cyberattacks comprises transmitting one or more packets containing the signature on the virtual network.

17. The non-transitory computer readable medium of claim 15, wherein executing the plurality of simulated cyberattacks comprises executing one or more scripts configured to provoke a response from the virtual network.

18. The non-transitory computer readable medium of claim 15, wherein the virtual network security system is configured based on a set of detection rules to detect a subset of the plurality of simulated cyberattacks.

19. The non-transitory computer readable medium of claim 15, wherein the virtual network security system is configured to monitor network traffic to a target entity of the virtual network, and wherein the plurality of simulated cyberattacks is executed against the target entity.

20. The non-transitory computer readable medium of claim 15, wherein the operations comprise receiving an alert from the virtual network security system indicating whether one or more of the simulated cyberattacks were detected by the virtual network security system.

* * * * *